United States Patent [19]

Hilden

[11] Patent Number: 5,012,885

[45] Date of Patent: May 7, 1991

[54] REAR WHEEL SUSPENSION AND STEERING SYSTEM

[75] Inventor: Gilbert R. Hilden, Owosso, Mich.

[73] Assignee: DLMA Transportation Inc., Troy, Mich.

[21] Appl. No.: 321,393

[22] Filed: Mar. 10, 1989

[51] Int. Cl.$^5$ .............................................. B60K 17/30
[52] U.S. Cl. ..................................... 180/254; 180/312; 180/353; 180/354; 280/91; 280/788
[58] Field of Search ............... 180/252, 253, 254, 312, 180/353, 354; 280/91, 788

[56] References Cited

U.S. PATENT DOCUMENTS

| | | | |
|---|---|---|---|
| 3,476,200 | 11/1969 | Schoepe et al. | 280/788 X |
| 3,765,698 | 10/1973 | Burrell | 180/254 X |
| 4,273,209 | 6/1981 | Orain | 180/254 |
| 4,343,375 | 8/1982 | Manning | 180/353 |
| 4,362,221 | 12/1982 | Manning | 180/353 |

FOREIGN PATENT DOCUMENTS

| | | | |
|---|---|---|---|
| 3635612 | 5/1987 | Fed. Rep. of Germany | 280/788 |
| 2295850 | 7/1976 | France | 180/353 |

Primary Examiner—Mitchell J. Hill
Attorney, Agent, or Firm—Reising, Ethington, Barnard, Perry & Milton

[57] ABSTRACT

The present invention relates to a rear wheel suspension and steering system utilizing a rectilinear shape dead axle of the type wherein a differential mechanism is mounted directly to a vehicle body structure and delivers driving power to vehicle wheels supported by the dead axle and in such a way that the differential can move vertically relative to the dead axle. More specifically, the invention relates to a lightweight suspension system wherein the rear wheels are mounted upon the dead axle so as to be steerable relative thereto.

5 Claims, 4 Drawing Sheets

REAR WHEEL SUSPENSION AND STEERING SYSTEM

BACKGROUND OF THE INVENTION

The present invention relates to a suspension or axle system for a vehicle, such as a bus or truck, wherein the rear wheels are steerable relative to the suspension system. The rear wheel steering system is intended to be utilized with a vehicle having combined therewith a conventional front wheel steering system.

It is well appreciated that a vehicle having steerable front and rear wheels provides the vehicle operator with many maneuvering advantages not available with a conventional front wheel only steering vehicle. While combined front and rear wheel steering systems have advantages for any type of vehicle, such combination is particularly useful with relatively long vehicles such as buses and trucks. Specifically, it is common that when such later vehicles turn a corner, they either have to make a very wide turn or, alternatively, in making a short turn the rear wheels of the vehicle are apt to either bump or ride over a curb. By having rear wheels that are steerable, the rear end of the vehicle may be kept away from a curb while the front end of the vehicle is making a relatively sharp turn.

As with companion application P-311 Rear Wheel Suspension System - Ewen, filed Dec. 23, 1988, it is not only an object of the present invention to provide a steerable rear wheel system, but also to combine such system with a suspension or dead axle device which enhances the roll or lateral stability for the vehicle. The stability is achieved basically in two ways. First, the unique axle design allows the body supporting springs to be located outboard in general longitudinal alignment with the steerable wheels. Second, the associated differential drive mechanism is mounted directly to the vehicle body and coacts with the axle to enable the body to be supported closer to the ground to thereby enhance stability as well as making easier the loading and unloading of the vehicle.

The basic suspension or axle system with which applicant's invention is combined is shown in U.S. Pat. No. 4,343,375 Vehicle Drive Wheel Suspension - Manning. The advantages of the Manning suspension as described in the aforementioned patent are also applicable to the present invention and are incorporated herein by reference. The primary advantages of the earlier Manning system is to provide a suspension wherein the unsprung weight of the system is greatly reduced by both supporting the differential from the vehicle body rather than the axle as well as in providing a dead axle system which is of a much lighter construction than conventionally forged axle systems.

The primary advantage of the subject suspension and steering system over the previously noted systems is in its simplification and reorganization of functional components that the present system is made to make it even lighter and less bulky than previous systems. The simplified construction of the present invention enables the ability of the vehicle body to be positioned closer to the ground further enhancing its lateral stability as well as making loading and unloading of the vehicle easier.

BACKGROUND ART

The most relevant prior art is the aforementioned Manning patent U.S. Pat. No. 4,343,375 including the prior art cited thereagainst, as well as the companion application P-311 - Ewen. The Manning patent and the art cited there against do not relate to suspension systems having steerable rear wheels. While Ewen added the feature of steerable rear wheels to the basic Manning suspension, the present invention provides a lighter weight and less bulky dead axle arrangement and a unique system for mounting the driving wheels both upon the dead axle and the vehicle body structure. The differences between the subject suspension system and the prior art will be made more apparent in the detailed description which follows.

Applicant is unaware of any other prior art that is relevant to the subject system.

DISCLOSURE OF THE INVENTION

Applicant's suspension system includes a light weight rack-type dead axle member having transversely spaced longitudinal beam members and cross beam members integrally joined to provide a rectilinear construction. As in the noted prior art devices, a differential mechanism is mounted to the vehicle body structure and includes output shafts connected to live axles which, in turn, are drivingly connected to the rear wheels. In the prior art devices, the rear wheels are supported solely upon the dead axle and the longitudinal beams of the axle are transversely perforated to permit the live axles and steering rods to extend therethrough. In contrast with this prior art, the longitudinal beams of applicant's dead axle are located entirely below the live axles and steering rods. Further the invention includes wheel ball joint assemblies each having upper and lower arms and wherein the lower arm is connected to the adjacent longitudinal beam while the upper arm is connected to a bracket member the inner end of which is pivotally mounted to the vehicle body structure. Thus, in applicant's device, the wheels move vertically with the dead axle and are steerable relative thereto but also are supported at their upper ends to the vehicle body structure in such a way as to be movable vertically relative thereto.

The details of the invention will be clearly understood from the following description of a preferred embodiment thereof which is shown in the drawings wherein:

DESCRIPTION OF THE PREFERRED EMBODIMENT

Figure 1:
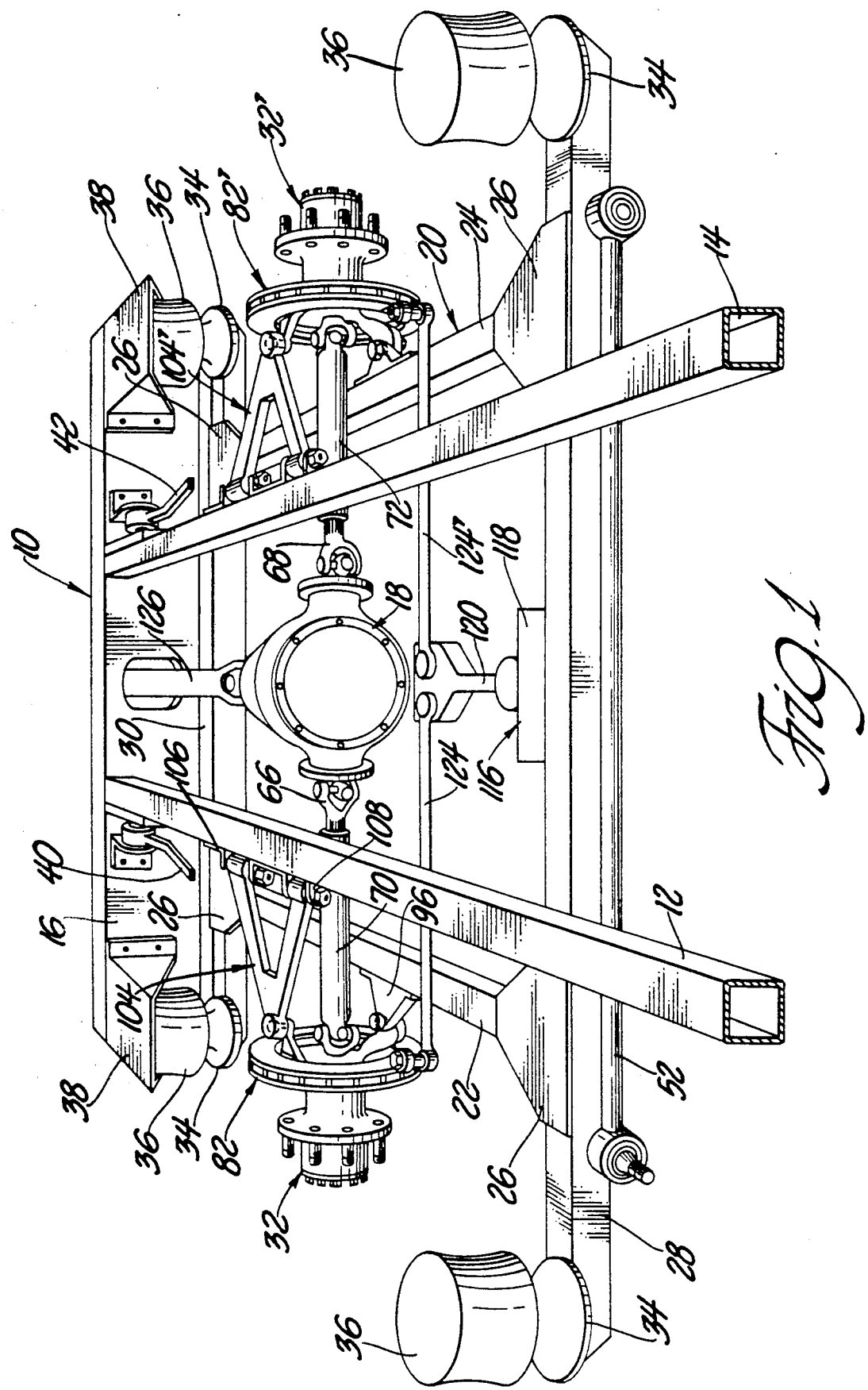
FIG. 1 is a longitudinal perspective view looking from front to rear of the vehicle and showing the overall arrangement whereby steerable rear wheels are connected to the dead axle and vehicle body structure.
Figure 2:
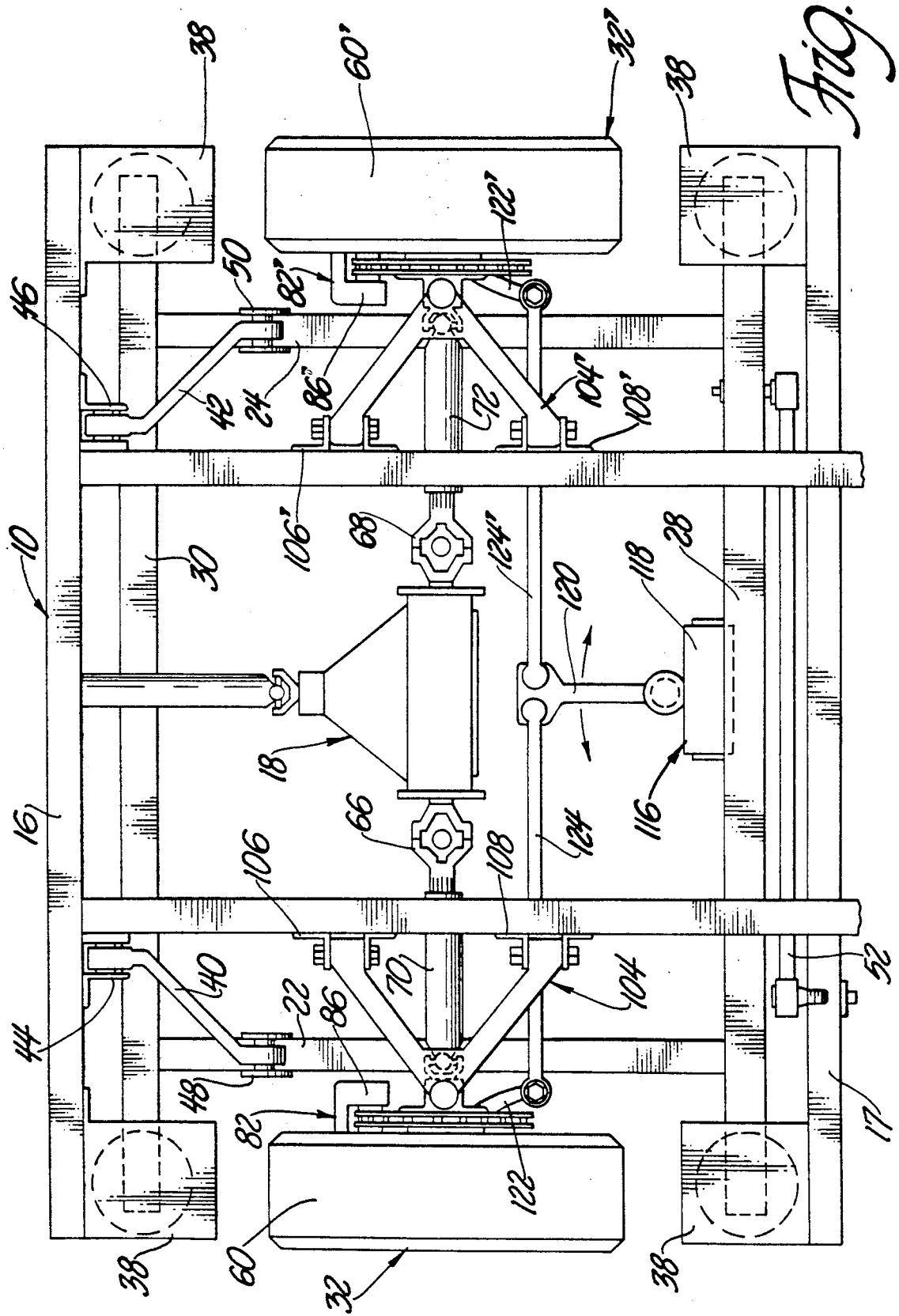
FIG. 2 is a plan view showing the suspension assembly generally as shown in FIG. 1.
Figure 3:
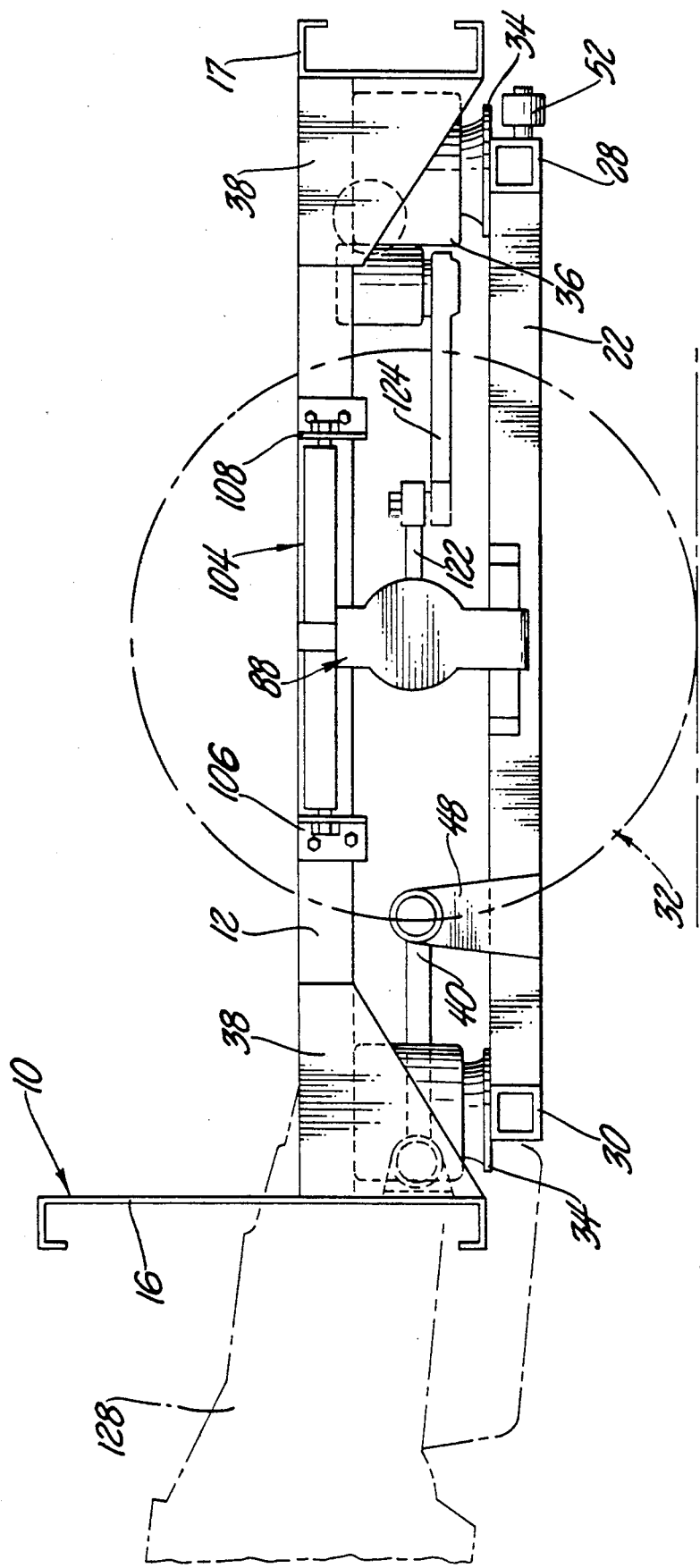
FIG. 3 is a side elevation of the suspension assembly as shown in FIG. 2.

Referring particularly to FIGS. 1-3, a vehicle body substructure or frame is indicated generally at 10 and which includes longitudinal beams 12 and 14 integrally connected with transverse bulkheads 16 and 17. The remainder of the vehicle body structure, not shown, is adapted to be mounted upon or otherwise integrated with the body subframe structure 10.

A differential mechanism is indicated generally at 18 and is adapted to be secured through suitable bracket means, not shown, to the vehicle body structure or subframe structure 10. In any case, the differential is fixed to and moves with the vehicle body structure to reduce the unsprung weight of the vehicle rear suspension system.

The rear suspension system includes a dead axle indicated generally at 20 and comprises a pair of transversely spaced longitudinal beams 22 and 24 which are integrally connected, as by flange or plate members 26, to longitudinally spaced transverse beams 28 and 30. It is most preferable to integrally form the box-like or rectilinear dead axle by welding plates or flanges 26 to the appropriate longitudinal and transverse beams.

As best seen in FIGS. 1 and 2, transverse beams 28 and 30 extend laterally so as to terminate in general longitudinal alignment with steerable rear wheel assemblies 32. Suitable spring means are adapted to be supported at the laterally outer ends of the dead axle cross beam members 28 and 30 to insure that the spring means are disposed subadjacent the outer periphery of the vehicle body structure to maximize the lateral or roll stability of the body. More specifically, it is preferred to support the vehicle body upon an air bag spring arrangement comprising supporting plates 34 suitably secured, as by welding, to dead axle cross beam members 28 and 30 and upon which plates air bag springs 36 are supported. Air bags 36 are in turn adapted to support the vehicle body substructure 10 through suitable brackets 38 welded or otherwise fixed to subframe transverse bulkheads 16 and 17. Thus, the vehicle body subframe structure 10 is supported by air bag springs 36 which are generally longitudinally aligned with the rear wheel assemblies 32 thereby maximizing the lateral stability of the vehicle body.

Dead axle 20 and body subframe 10 are articulated together through suitable links 40 and 42. The rear ends of links 40 and 42 are respectively pivotally connected to bulk head 16 through suitable brackets 44 and 46. The other ends of links 40 and 42 are respectively connected to the longitudinal dead axle beams 22 and 24 through bracket members 48 and 50. While permitting relative vertical movement between the vehicle body and the dead axle, links 40 and 42 prevent longitudinal separation between the body and dead axle.

To maintain the lateral or transverse relationship between the vehicle body and the dead axle, a Panhard rod or link 52 is pivotally connected at one end to transverse beam 28 of the dead axle while being pivotally connected at its other end to subframe bulkhead 17. Thus, while the vehicle body and dead axle may move vertically relative to each other, the links 40 and 42 along with Panhard rod 52 maintain the longitudinal and transverse relationships between the vehicle body and the dead axle as shown in the drawings.

It is important to note that the dead axle transverse and longitudinal beams 28, 30 and 22, 24 are generally of the same cross section shape throughout their lengths. Looking at the ends of beams 28 and 30 as seen in FIG. 3, beams are generally of a square and hollow construction. This is to be contrasted with the earlier companion designs wherein the longitudinal beams had substantially larger vertical dimensions than the transverse beams. In the earlier arrangements, it was necessary to provide openings in the longitudinal beams to accommodate the transverse passage of live axles and steering rods. In the present invention, the live axles and steering rods are disposed above the upper surfaces of the longitudinal beams as best seen in FIG. 1 of the drawings. In other terms, the longitudinal and transverse beams of dead axle 20 include upper surfaces which are generally disposed in a common horizontal plane the latter which is spaced below the live axles and steering rods. Thus the subject unique wheel suspension system, as further hereinafter described, enables the use of longitudinal beams for the dead axle having substantially reduced weight and vertical displacement which allows the vertical lowering of the vehicle body relative to the ground thereby achieving the advantages already noted.

Figure 4:
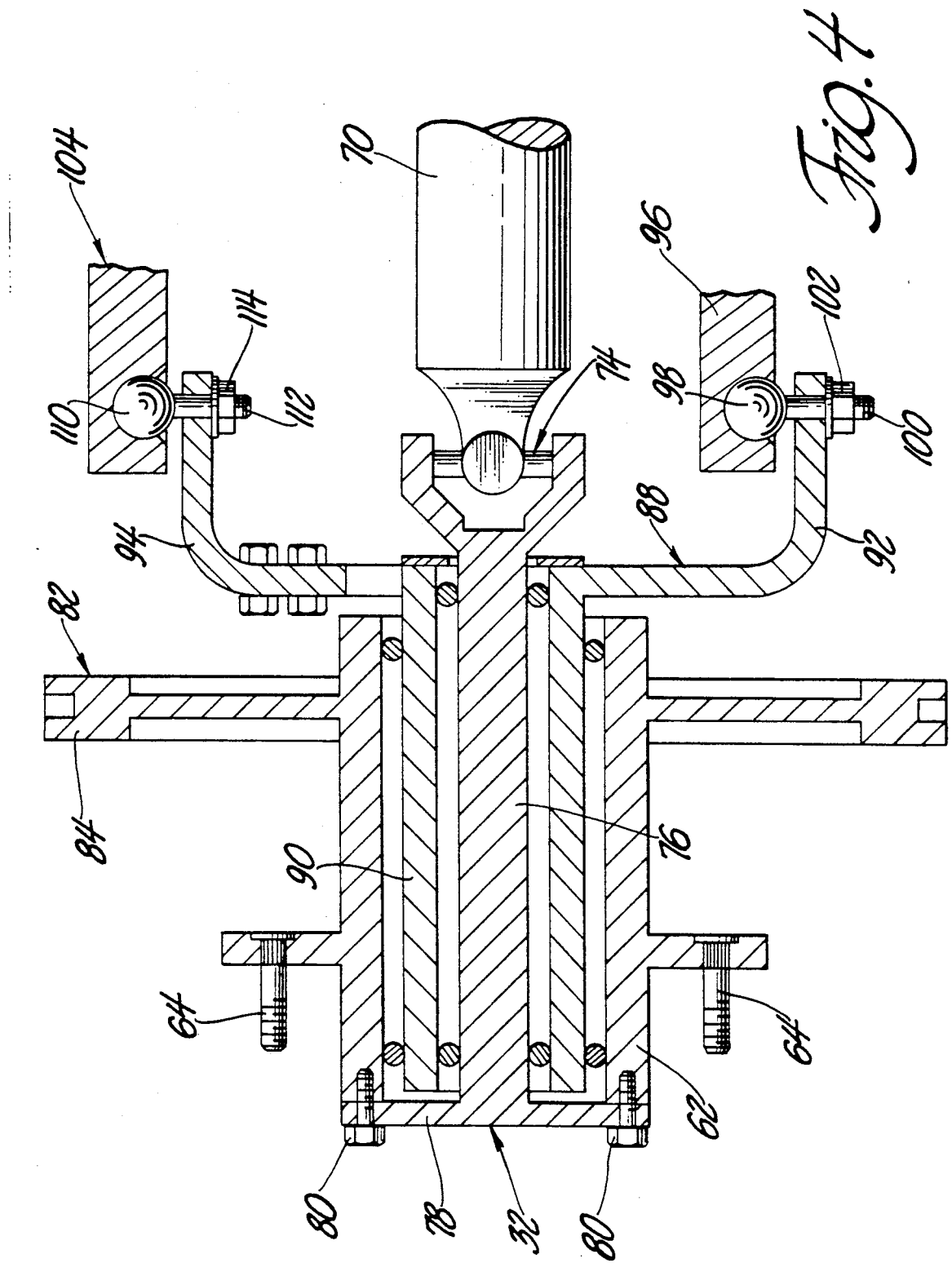
FIG. 4 is a partially sectioned enlargement showing the details of a steerable wheel assembly.

The wheel assemblies are indicated generally at 32, with the tires removed for structural clarity in FIGS. 1 and 4, and inasmuch as they as well as the mechanisms for mounting these assemblies on the dead axle and the vehicle body subframe are identical, only one such wheel assembly and mounting structure will be described with the other assembly being identified by the same numerals with prime marks. Referring particularly to FIGS. 1, 2 and 4 of the drawings, tire wheel 60 is adapted to be mounted upon wheel supporting hub 62 through suitable stud members 64 and coacting lugs not shown. Differential 18 includes output shafts 66 and 68 which are suitably connected through a conventional spline arrangement to live axles 70 and 72. The outer ends of live axles 70 and 72 are connected through a universal joint 74 to a wheel driving shaft 76 which includes a flanged outer end 78 connected through studs 80 to wheel supporting hub 62 whereby rotation of live axle 70 and 72 imparts driving action to the wheels 60.

A disc brake assembly is indicated generally at 82 and includes a rotating disc member 84 integral with wheel supporting shaft 62 and a caliper member 86, FIG. 2, adapted to selectively engage the rotating disc to impart a braking motion to the wheel 60.

A non-rotatable wheel supporting yoke is indicated generally at 88 and includes a hollow shaft portion 90 concentrically arranged between outer wheel supporting hub 62 and wheel driving shaft 76. Suitable bearing members are disposed internally and externally relative to yoke shaft 90 whereby the wheel supporting hub 62 and the wheel driving shaft 76 may rotate relative to the non-rotating yoke shaft 90. Yoke 88 includes lower and upper arms 92 and 94 through which the wheel assembly is supported respectively upon dead axle 20 and vehicle body subframe 10.

A laterally extending bracket 96 is integrally fixed to longitudinal beam 22 of the dead axle and is articulated to yoke arm 92 through a suitable ball joint member 98 which includes a stud portion 100 fixed through nut 102 to yoke arm 92. Thus, ball joint 98 permits the wheel assembly to be rotated for steering purposes relative to the dead axle while, at the same time, supporting the wheel assembly for vertical movement with the dead axle.

An upper wheel supporting bracket or link is indicated generally at 104 and includes a pair of diverging legs respectively pivotally connected through brackets 106 and 108 to longitudinal subframe beam 12. The outer end of link 104 includes a ball joint member 110 which includes a stem or stud portion 112 and a nut 114 through which the ball joint is connected to the upper yoke arm 94. Thus, when the wheel assembly 32 moves up and down with the dead axle 20, the upper yoke link 104 accommodates such relative movement while at the same time supporting the upper end of the wheel assembly so that the latter may also be steerable.

A power steering mechanism is indicated generally at 116 and includes a power cylinder 118 adapted to impart a rotational movement to arm 120. Each wheel assembly yoke 88 includes an integral steering arm 122 which is articulated to one end of a steering rod 124 the inner end of which is, in turn, articulated to power steering lever 120. Thus wheel assemblies 32 are steered in response to remote operator actuation of the power steering device 116. The power steering mechanism is suitably mounted upon dead axle 20 such that the steering rods 124 are vertically spaced above the longitudinal dead axle beams 22 and 24.

As taken in conjunction with FIGS. 1 and 3, a differential power input shaft is indicated at 126 and is adapted to be driven by an engine 128 shown in phantom only in FIG. 3.

In summary, applicant has created a unique rear suspension assembly which supports steerable rear vehicle wheels in a way that the wheels are steerably supported both to the dead axle and the vehicle body subframe in such a way as to accommodate relative movement between the dead axle and the vehicle body. Applicant's combination of elements has also enabled the construction of a suspension system both lighter in weight and lower in vertical displacement than previous systems. Finally, applicant has created a rear suspension system that makes it unnecessary to perforate or otherwise provide openings through dead axle beam members to accommodate the lateral passage of live axles and steering rods.

Other modifications of the invention are possible within the scope of the invention as set forth in the hereinafter appended claims. The numerals used in the claims are to facilitate understanding the invention which is not intended to be limited by the specific elements so identified.

What is claimed is:

1. A rear wheel support and driving system of the type comprising a rack-type dead axle (20) adapted to support a vehicle body structure (10) spring means (36) for supporting the body structure upon the dead axle, a pair of wheel assemblies (32), ball joint means (98–102, 110–114) for steerably supporting said wheel assemblies upon said dead axle, a differential drive mechanism (18) supported upon the vehicle body structure and movable with said structure relative to the dead axle, the differential mechanism including a power input shaft (126) and power output shafts (66, 68), a pair of live axles (70, 72) respectively drivingly connected at one end to the output shafts and at the other end to wheel driving shafts (76, 76'), said wheel driving shafts being rotatably supported within said wheel assemblies, the dead axle being generally rectilinear in shape and having a first pair of longitudinal beams (22, 24) respectively transversely spaced outboard of said differential mechanism, a second pair of cross beams (28, 30) respectively spaced fore and aft of said differential mechanism and integrally secured to the first pair of beams, the improvement comprising:
A. each wheel assembly (32) includes a yoke (88) having upper and lower arms (94, 92);
B. first means (96, 98–102) connecting the lower yoke arm (92) to the longitudinal beam (22) whereby the wheel assembly is both steerable relative to and vertically movable with the dead axle;
C. second means (106–112) connecting the upper yoke arm (94) to the vehicle body structure (10) in a way that the wheel assembly is both steerable and vertically movable relative to the body structure; and
D. means (116–124) for imparting steering movement to the wheel assemblies (32).

2. A rear wheel support and driving system as set forth in claim 1 wherein the live axles (70–72) are vertically spaced above the dead axle (20).

3. A rear wheel support and driving system as set forth in claim 1 wherein the longitudinal (22–24) and cross (28–30) beams are of the same cross sectional shape and include upper surfaces disposed in a common plane said live axles (70–72) being vertically spaced above said plane.

4. A rear wheel support and driving system of the type comprising a rack-type dead axle (20) adapted to support a vehicle body structure (10) thereupon through suitable spring means (36) for supporting the body structure upon the dead axle, a pair of wheel assemblies (32), ball joint means (98–102, 110–114) for steerably supporting said wheel assemblies upon said dead axle, a differential drive mechanism (18) adapted to be supported upon the vehicle body structure and movable with said structure relative to the dead axle, the differential mechanism including a power input shaft (126) and power output shafts (66, 68), a pair of live axles (70, 72) respectively drivingly connected at one end to the output shafts and at the other end to wheel driving shafts (76, 76'), said wheel driving shafts being rotatably supported within said wheel assemblies, the dead axle being generally rectilinear in shape and having a first pair of longitudinal beams (22, 24) respectively transversely spaced outboard of said differential mechanism, a second pair of cross beams (28, 30) respectively spaced fore and aft of said differential mechanism and integrally secured to the first pair of beams, the improvement comprising:
A. each wheel assembly (32) includes a yoke (88) having upper and lower arms (84, 92) a bracket (96) fixed to a longitudinal beam (22), first ball joint means (98–102) articulated between the lower yoke arm (94) and the bracket whereby the ball joint assembly is steerably connected to the dead axle and moves vertically therewith;
B. a link (104) having its laterally inner end pivoted to the vehicle body structure (10) and its outer end terminating proximate the upper arm (92) of the wheel assembly, second ball joint means (110–14) articulating the outer end of said link and said upper yoke arm (94) whereby the wheel assembly is steerably connected to link (104) and pivotally connected to the vehicle body structure allowing said wheel assembly to move vertically with said dead axle and relative to said body structure; and
C. means (116–124) for imparting steering movement to the wheel assemblies (32).

5. A rear wheel support and driving system as set forth in claim 4 wherein each wheel assembly includes a shaft (76) connected to and driven by the live axle (70), said yoke (88) including a hollow sleeve (90) concentric with said shaft (76), said shaft being rotatably supported within said sleeve, a wheel supporting hub (62) rotatably mounted upon the yoke sleeve and drivingly connected to the wheel shaft (76).

* * * * *